UNITED STATES PATENT OFFICE.

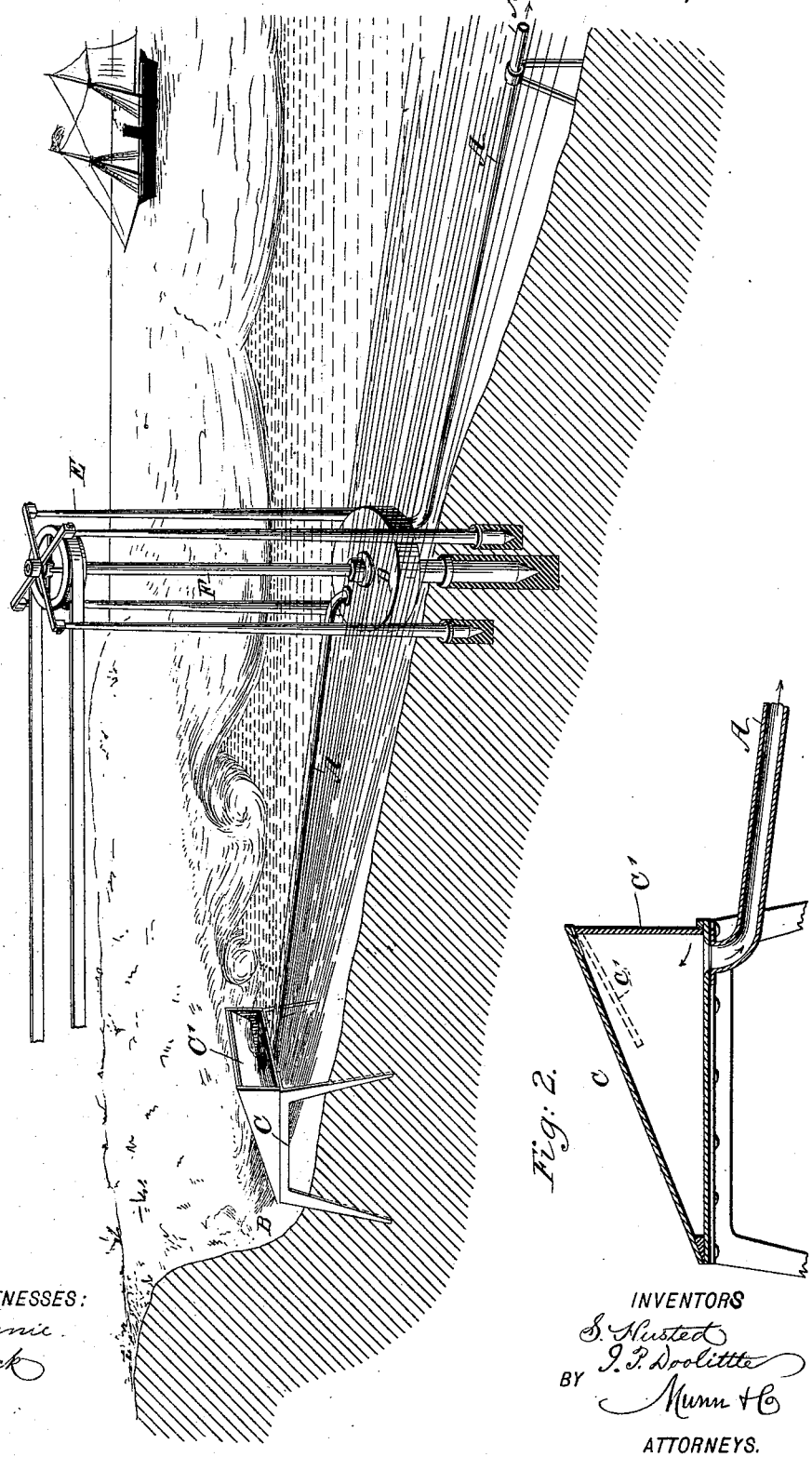

SINGLETON HUSTED AND IRVIN P. DOOLITTLE, OF LOS ANGELES, CALIFORNIA.

WAVE AND CURRENT POWER.

SPECIFICATION forming part of Letters Patent No. 513,930, dated January 30, 1894.

Application filed April 27, 1893. Serial No. 472,137. (No model.)

*To all whom it may concern:*

Be it known that we, SINGLETON HUSTED and IRVIN P. DOOLITTLE, both of Los Angeles, in the county of Los Angeles and State of California, have invented a new and Improved Wave and Current Power, of which the following is a full, clear, and exact description.

The object of the invention is to provide a new and improved wave and current power, which is simple and durable in construction and arranged to utilize the force of the waves and the undertow to the fullest advantage for the transmission of power.

The invention consists of a pipe or raceway containing a water motor, and having its intake at the inshore end of the waves, the said pipe extending in the path of the undertow.

The invention also consists of certain parts and details and combinations of the same, as will be fully described hereinafter and then pointed out in the claims.

Reference is to be had to the accompanying drawings forming a part of this specification, in which similar letters of reference indicate corresponding parts in both the views.

Figure 1 is a sectional perspective view of the improvement as applied; and Fig. 2 is a sectional side elevation of the intake box for the raceway.

The improved wave power is provided with an inclined raceway A, preferably made in the shape of a pipe and extending along the path of the undertow flowing outward from the shore B, as is well understood.

The shore end of the raceway A is in the bottom of a box C fastened in place on the beach and preferably triangular in cross section, with the outer side arranged as a hinged door C', adapted to swing inward by the force of the incoming waves and self-closing on the return flow or retreat of the wave.

In the raceway A, approximately midway between the ends, is arranged a water motor D of any approved construction and held in a suitable framework E, set in the ground, as illustrated in Fig. 1. The upper end of the motor shaft F is connected by pulley and belt with the machinery to be driven and located on the shore. Now, it will be seen that when a wave strikes the door C' the latter opens and the water passes into the box C, and on the retreat of the wave the door closes so that the water flows through the raceway A to actuate the motor D, the power of which is transmitted to the machinery to be driven. It is understood that the crest of the wave enters the box C, so that the water will attain considerable pressure in the raceway on the outward flow of the wave, and this power is augmented by the suction action of the undertow on the off-shore end A' of the raceway.

If desired, a number of in-take boxes C may be connected with each other to permit a very large amount of water to pass down the raceway at the receding of the waves, it being understood that the several boxes thus connected, discharge into the one connected with the raceway.

It is understood that an enlargement is formed in the raceway for the motor or actuator, and this enlargement may be placed at any desired point in the raceway.

Having thus fully described our invention, we claim as new and desire to secure by Letters Patent—

1. A wave and current power provided with a raceway arranged in the path of the undertow, and having its shore in-take approximately at the crest of the waves, substantially as shown and described.

2. A wave and current power provided with an in-take box arranged near the shore and adapted to receive the water at the highest points of the waves, and a raceway leading from this box and containing a water motor, the said raceway being arranged in the path of the undertow or other out-going currents, to make use of the suction or exhaust power thereof, and terminating at a suitable distance offshore, substantially as shown and described.

3. A wave and current power comprising an in-take box having a self-closing door, a raceway leading from the bottom of the box and extending in the path of the undertow, and a water motor arranged in the said raceway, about midway between the said box and the offshore end, substantially as shown and described.

SINGLETON HUSTED.
IRVIN P. DOOLITTLE.

Witnesses:
ENOCH PEPPER,
N. H. DE LA MATYR.